United States Patent [19]

Mieszczak

[11] 4,092,205
[45] May 30, 1978

[54] MACHINE FOR INSTALLING TEES

[76] Inventor: William Mieszczak, 4396 Iroquois Ave., Erie, Pa. 16511

[21] Appl. No.: 768,773

[22] Filed: Feb. 15, 1977

Related U.S. Application Data

[63] Continuation-in-part of Ser. No. 543,032, Jan. 22, 1975, abandoned.

[51] Int. Cl.² .................. B25B 1/20; B25B 27/00; F16L 47/02
[52] U.S. Cl. .................. 156/499; 100/293; 156/556; 156/580; 156/583; 269/41; 269/129
[58] Field of Search ............... 156/499, 580, 581, 583, 156/556; 100/93 P, 219, 231, 283, 293; 269/41, 45, 129

[56] References Cited

U.S. PATENT DOCUMENTS

| 789,906 | 5/1905 | Gordon | 100/283 |
|---|---|---|---|
| 1,226,778 | 5/1917 | LaPorte | 100/293 |
| 2,048,542 | 7/1936 | Dunlap | 156/580 |
| 2,332,318 | 10/1943 | Hughes | 100/293 |
| 2,554,884 | 5/1951 | Smith et al. | 156/580 |
| 3,013,925 | 12/1961 | Larsen | 156/499 |
| 3,097,843 | 7/1963 | Morrow | 269/45 |
| 3,743,566 | 7/1973 | Louthan et al. | 156/499 |
| 3,788,211 | 1/1974 | Mason, Jr. | 100/93 P |
| 3,966,528 | 6/1976 | Christie | 156/499 X |

FOREIGN PATENT DOCUMENTS

| 141,692 | 1951 | Australia | 100/293 |

Primary Examiner—David Klein
Assistant Examiner—M. G. Wityshyn
Attorney, Agent, or Firm—Charles L. Lovercheck

[57] ABSTRACT

An apparatus for attaching a thermoplastic fitting to the side wall of a pipe is disclosed. The apparatus is made up of a generally U-shaped frame having legs supporting two spaced pipe clamps. The frame supports a fitting holder on a springloaded rod by which a controlled force can be applied on the fitting while fusing the fitting to the pipe. The fitting can also be moved toward and away from the pipe in order to insert and remove a heating mechanism to melt the plastic.

9 Claims, 9 Drawing Figures

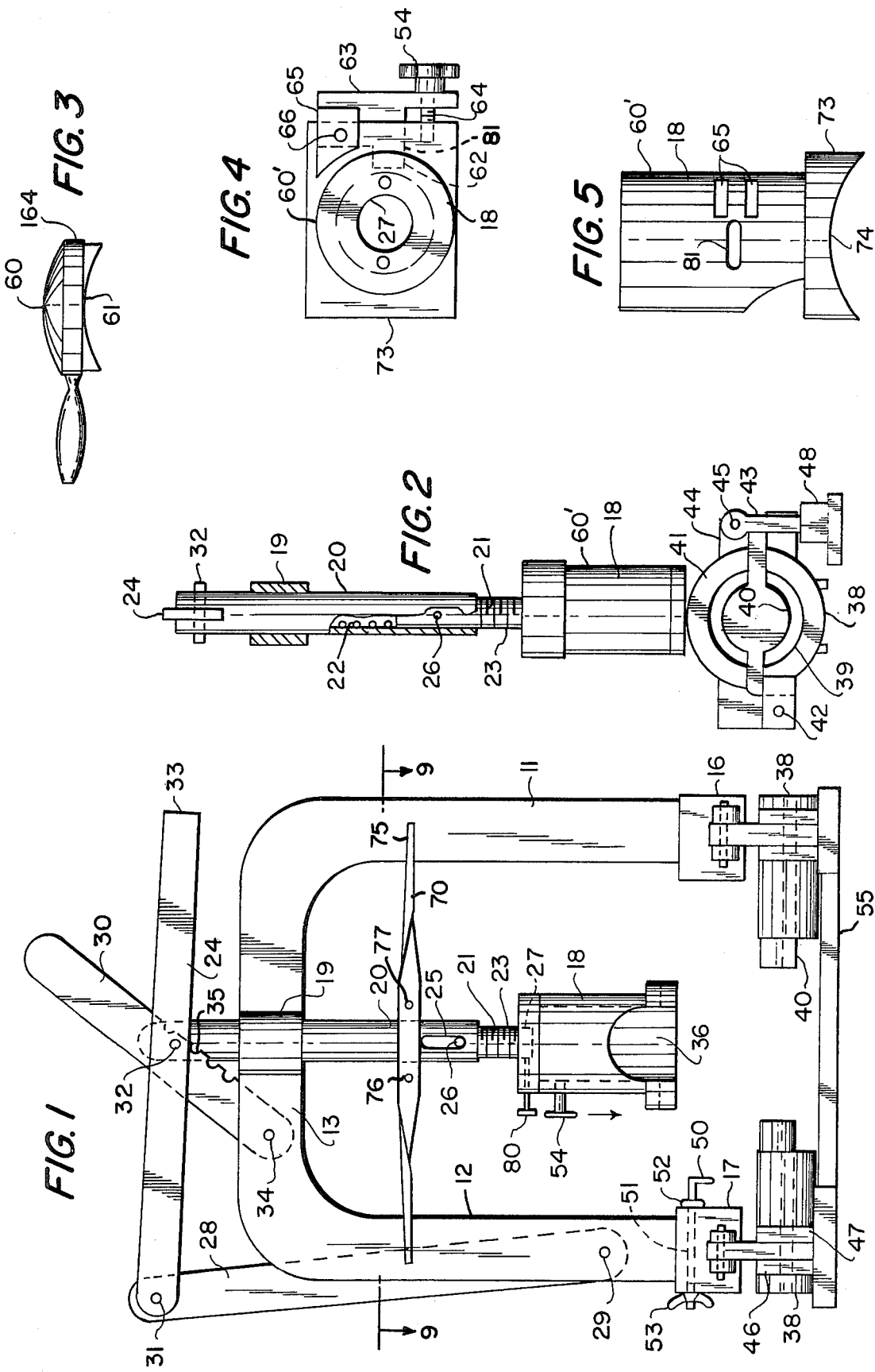

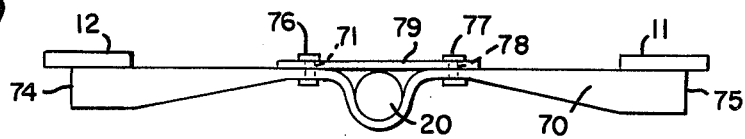
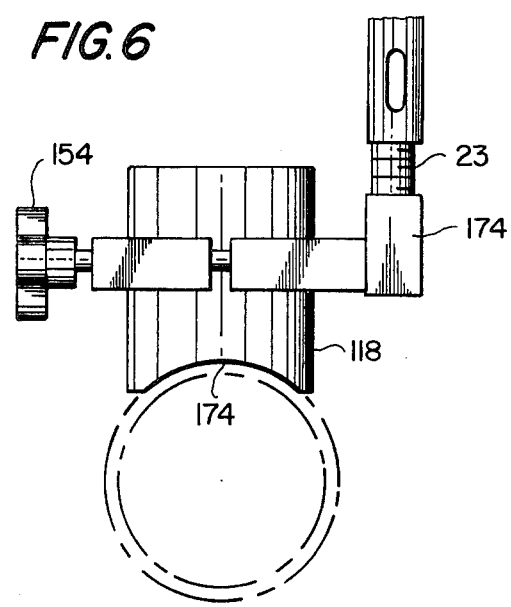
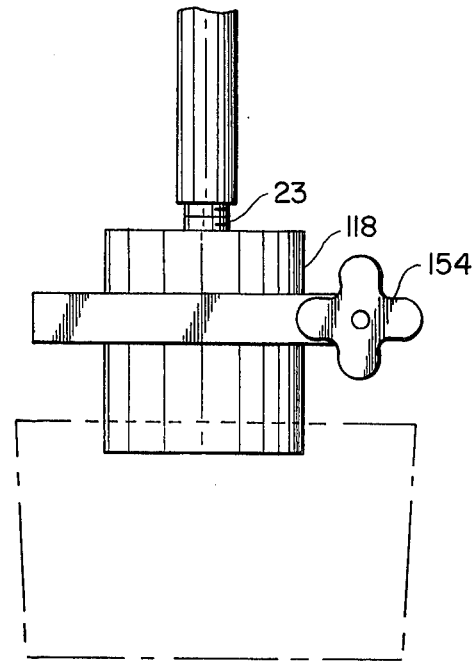
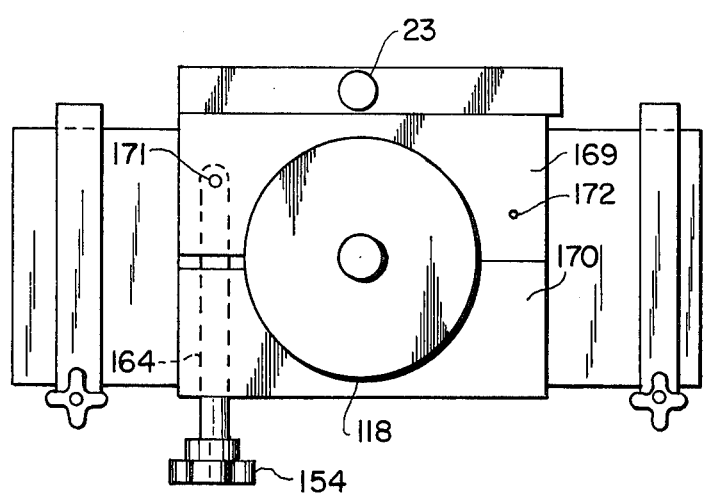

MACHINE FOR INSTALLING TEES

REFERENCE TO CO-PENDING APPLICATION

This application is a continuation-in-part of patent application Ser. No. 543,032 filed on Jan. 22, 1975 now abandoned.

REFERENCE TO PRIOR ART

The present application constitutes an improvement over U.S. Pat. No. 3,743,566, and the method disclosed in U.S. Pat. No. 2,387,154.

GENERAL DESCRIPTION OF THE INVENTION

The apparatus disclosed herein is commonly referred to as a fitting fuser, is compact and light in weight, and will fill the need of a simple and practical unit providing accurate means of holding pipe and fitting with controlled pressure while heat is applied and while the fitting is being fused to the pipe.

OBJECTS OF THE INVENTION

It is an object of the invention to provide an improved apparatus for fusing plastic fittings to the side walls of plastic pipe.

Another object of the invention is to provide a fuser for attaching fittings to the side wall of a pipe which is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a front view of the fitting fuser according to the invention.

FIG. 2 is a side view of the fuser shown in FIG. 1.

FIG. 3 is a view of the heater for use with the apparatus shown in FIGS. 1 and 2.

FIG. 4 is a top view of the fitting support.

FIG. 5 is a side view of the fitting support.

FIG. 6 is a front view of another embodiment of the fitting support.

FIG. 7 is a side view of FIG. 6.

FIG. 8 is a top view of FIG. 6 and FIG. 7.

FIG. 9 is an enlarged top view of the guide bracket.

DETAILED DESCRIPTION OF THE DRAWINGS

Now, with more particular reference to the drawings, a machine for attaching thermoplastic fittings, for example, saddle fittings to the side wall of the thermoplastic pipe is shown. The machine is made up generally of the rigid U-shaped yoke having spaced legs 11 and 12 and an intermediate part 13 rigidly connecting the two legs together. The U-shaped yoke could be made of a single intergral piece of metal or it could be fabricated from suitable metal structural sections.

The legs 11 and 12 of the U-shaped yoke or frame are fixed to the intermediate part 13 and may be integral therewith forming a rigid frame. A first pipe clamp 16 is connected to the distal end of the first leg 11 and the second pipe clamp 17 is fixed to the distal end of the second leg 12. The fitting support 18 is connected to the lower end of the threaded rod 21 by a suitable internal thread 27 and external thread 23 on the rod.

The tubular member 20 is slidably received in a bearing 19 in intermediate member 13. The tubular member 20 telescopically receives the rod 21 and pin 26 extends through the rod 21 and slides up and down in the slot 25. The ends of slot 25 limit the upward and downward movement of the rod 21 relative to the tube 20. A compression spring 22 is supported in the tubular member 20 against the upper end of the rod 21 urging the rod away from the tubular member 20.

The fitting support is moved up and down by handle 24 acting through link 28. The link 28 is pivoted to the frame at 29 and is pivoted to an end of the handle 24 at 31. The handle 24 is pivoted to the tubular member 20 by pintle 32. Thus, by moving the end 33 of the handle up and down, the fitting support 18 is moved up and down relative to the pipe supported in the clamps 16 and 17 and extending between them. A link 30 is pivoted to the rigid frame at 34 and the link 30 has spaced notches 35 which may be brought into engagement with pintle 32 in the handle 24.

FIG. 9 is a detailed view of the branch fitting guide bracket as shown in FIG. 1. The branch fitting guide bracket 70 receives the cylindrical body 20 and guides it up and down. The guide bracket 70 has a generally cylindrical internal surface which engages the outer periphery of the cylindrical body 20. The main part of the guide bracket has ends 74 and 75 which slidably engage the spaced legs 11 and 12 of the U-shaped yoke. The main part 70 is a flat plate twisted at each side of the member 20 so that the edges of part 70 slidably engage members 11 and 12. The plate 79 is held to the part 70 by suitable bolts 76 and 77 which are received in holes 71 and 78 in each of the parts 70 and 79.

The heater in FIG. 3 is supported between the fitting in support 18 to be fused and the pipe to which it is to be fused. Thus, while the fusing operation is taking place, the handle 24 may be moved down to bring the pintle 32 into one of the notches 35 so that the spring 22 will exert the desired compressive force on the fitting. The fitting support 18 may be rotated on threaded rod 21 to move it toward or away from the tubular member 20. When the fitting support 18 is forced down, the pin 26 will move toward the upper edge of the slot 25, and when the correct position on the threaded end 23 is reached, the pin 26 will engage the upper edge of the slot 25 thereby limiting the downward movement of the handle 24. The fitting support 18 may then be properly adjusted by rotating it the required number of turns on the threaded end 23 of rod 21 so that the pintle 32 may be supported in one of the notches 35 when the fitting in fitting support 18 is in contact with the pipe.

In like manner, when a heater, such as shown in FIG. 3, is supported between the fitting in the support 18 and the pipe supported in clamps 16 and 17, the pintle 32 may be supported to one of the notches 35 thereby supplying a constant force through springs 22 to the fitting.

The embodiment of the fitting support shown in FIGS. 1 and 2 is a simplified structure wherein a single screw 54 threadably engages the support 18 and when the screw 54 is tightened, the inner end of it engages the fitting in the fitting support holding the fitting in place.

In the embodiment of the fitting support shown in FIGS. 4 and 5, the fitting support 18 comprises a generally cylindrical body 60', a cylindrical opening 36 in the body receives the fitting of the fitting to be attached to the pipe.

A laterally disposed opening 81 is formed in the side of the fitting support 18 to receive detent 62. Detent 62 is fixed to the lever 63 and extends through the laterally disposed opening 81. The lever 63 has one end received between lugs 65 and is swingably connected to the lugs by means of the pivot pin 66. A threaded bolt 64 is threadably received in the fitting support 18 and the threaded bolt 64 has a hand wheel 54 that overlies the lever 63 and urges the lever toward the fitting support 18. The detent 62 engages the fitting in the fitting support and holds it in position. The fitting support has a flange 73 attached to its lower end and the flange 73 has a concave bottom surface 74 which is the same contour as the fitting to be engaged and to be attached to the pipe that is supported in the clamps 16 and 17.

The embodiment of the fitting support shown in FIGS. 6, 7 and 8 is slightly different than the embodiment shown in FIGS. 1 and 2 and in FIGS. 4 and 5 in that a laterally offset fitting support 118 is shown that has a concave lower fitting engaging surface 174 and a hand wheel 154 attached to a threaded stud 164. The fitting support has a first part 169 and a second part 170 that are urged toward each other by the threaded stud 164 which is pivoted at 171 to the part 169. The second part 170 is pivoted at 172 to the first part 169.

The vertically extending part 174 of the fitting support receives the threaded member 23 as in the embodiment of FIG. 1 in a suitable threaded opening therein. The fitting support 118 can be used in the apparatus shown in FIG. 1 instead of the fitting support 18.

The clamps 16 and 17 each have fixed parts that are fixed to the legs 11 or 12 and a swingable part. The movable part of the clamps 16 and 17 each have an upper cylinder-shaped surface 39 which engages the pipe to be saddled. The liners 40 can be supported in the clamp to accommodate a smaller size pipe. The pivoted part 41 of the clamps 16 and 17 is swingably connected to the fixed part by pivot 42 and a threaded member 43 is pivoted to the lug 44 of the clamping member at 45. The lower liners must be longer than the upper to provide shorter space between clamps to accommodate the lesser strength of small pipes for fusing purposes. The threaded member 43 extends through a space between lugs 46 and 47 and has a hand wheel 48 supported on the lower end thereof whereby the pipe can be rigidly clamped inside the clamping member. Lower parts 38 are secured to the ends of rigid bar 55.

When the pipe is to be heated, a heater locater 50 supported on clamp 17 of the apparatus is adjusted laterally to proper position. The heater locater 50 extends through clamp 17 and it has an adjusting nut 52 and a winglike clamp nut 53 that clamps it to the clamp 17. Thus, the heater will be positioned by the heater locater 50 when the locater has been properly positioned so that the heater locater will engage the heater 164 supported on the fitting support 18.

To carry out the process with the apparatus disclosed herein, the proper insert for the liner 40 is first selected to accommodate the pipe to be used in the clamps 16 and 17. The proper fitting support 18 to accommodate the particular size and configuration of the fitting will be attached to threaded shaft 21. The fitting support 18 will then be assembled on the threaded end 23 at approximately one-half inch from the end of the shaft and the thumb screw 80 tightened to engage a flat spot on shaft 21 to hold the fitting support in this position. Screwing the fitting support 18 further onto shaft 21 has the effect of shortening shaft 21 and, therefore, the spring 22 is not compressed as much when the fitting is clamped in place on the pipe. Screwing support 18 effectively elongates the shaft 21 and adds additional force on the spring. Slot 25 will be made long enough to allow for a wide range of force on the spring.

The pipe to which a fitting is to be attached, is placed between clamps 16 and 17 and the movable parts 41 are swung to closed position. A heater with the proper face surfaces 60 and 61 is then inserted under the fitting with the convex side of the cylindrical body 60 upward and the concave side 61 resting on the pipe supported in the clamps 16 and 17. The surface of the pipe is then cleaned properly to render it free of all foreign material. The heater is brought into engagement with the heater locater 50 to properly position the heater between the pipe and the fitting. When the heater is at the proper temperature, it is brought into engagement with the fitting and pressure is applied by locking the tubular member 20 in the proper notch 35 sandwiching the heater between fitting and pipe. After time has elapsed sufficient to melt the plastic surface of the fitting and the pipe handle is unlocked and lifted up, the heater is removed. The handle is then brought down again to bring the pintle 32 into the proper notch 35 and there causing the spring 22 to exert the force by proper force on the fitting. The fitting is then allowed to cool for three to five minutes in this position. The thumb screw 54 is unlocked releasing the fitting and handle 33 raised pulling the fitting support 18 out of engagement with the fitting. The pipe can then be removed from the clamps 16 and 17 and the pipe used. The fitting and the pipe could also be clamped by a screw 54 instead of a cam clamp 62-63.

The foregoing specification sets forth the invention in its preferred practical forms but the structure shown is capable of modification within a range of equivalents without departing from the invention which is to be understood is broadly novel as is commensurate with the appended claims.

The embodiment of the invention in which an exclusive property or privilege is claimed are defined as follows:

1. A machine for attaching thermoplastic fittings to the sidewall of a thermoplastic pipe comprising:
    a generally U-shaped yoke having an intermediate member and two spaced legs intergrally attached to said intermediate member,
    a bearing member on said intermediate member between said spaced legs,
    a tubular member slidably received in said bearing member and disposed in parallel relation to said legs and axially slidably parallel to said legs,
    pipe clamping means on the distal end of each said leg romote from said intermediate member whereby a pipe for receiving a fitting may be supported on said legs in spaced parallel relation to said intermediate member,
    said clamping means comprising two first pipe clamp parts and two second pipe clamp parts,
    hinge means swingably connecting each said second pipe clamp part to a respective said first pipe clamp part and a clamping member on each said first pipe clamp part for clamping each said second pipe clamp part to a respective said first pipe clamp part with a pipe therebetween, means rigidly fixing each of said first pipe clamp parts to the distal end of each said leg of said frame, and means extending generally parallel to said intermediate member of said U-shaped yoke for rigidly supporting said second pipe clamp parts, a threaded rod telescopically received in said tubular member, means on said threaded rod for supporting a fitting support to be attached to said pipe, a longitudinally extending slot in said tubular member, and a compression spring in said tubular member engaging said threaded rod and adapted to urge said threaded rod toward a pipe supported in said pipe clamping means, a pin diametrically extending from at least one side of said threaded rod and received in said slot for limiting the movement of said threaded rod toward and away from said pipe, handle means attached to said frame and engaging said tubular member for moving said tubular member toward and away from said pipe, releasable means on said fitting support for holding a fitting to be attached to said pipe in said fitting support.

2. The apparatus recited in claim 1 wherein said means for supporting said fitting support on said rod comprises, a threaded opening in one end of said fitting support and a threaded end on said rod whereby the distance of said fitting support from said spring can be adjusted.

3. The machine recited in claim 2 wherein a locking means is provided for locking said fitting support in a predetermined position on said threaded end.

4. The machine recited in claim 3 wherein said locking means comprises a set screw.

5. The apparatus recited in claim 1 wherein said fitting support is adapted to support a fitting above a heater supported on a pipe disposed in said clamping means and a heater locater comprising a threaded rod which is attached to one said leg of said U-shaped member, said heater locater being adapted to be adjusted toward and away from said fitting support whereby one side of said heater can engage said heater support thereby locating said heater relative to said fitting support.

6. The apparatus recited in claim 1 wherein said handle means comprises a handle swingably connected at an intermediate part thereof to said tubular member, a link swingably connected to said U-shaped yoke at a first end of said link, the second end of said link being swingably connected to one end of said handle.

7. The apparatus recited in claim 6 wherein a second link is swingably connected to said U-shaped yoke at a position spaced from said first mentioned link, said second link having a plurality of notches therein and a pintle in said handle at said intermediate part thereof, said second link notches being adapted to selectively engage said pintle whereby said handle is held in a predetermined position.

8. The machine recited in claim 1 wherein an elongated bar is fixed to said tubular sleeve adjacent the lower end of said tubular sleeve, whereby the ends of said bar slidably engage said legs, guiding said tubular sleeve up and down.

9. The machine recited in claim 8 wherein said bar is rectangular in cross-section and one of its major sides engage said tubular sleeve and the ends of said bar are twisted whereby a narrow edge of said bar engages said legs.

* * * * *